US007163985B2

(12) United States Patent
Ortiz et al.

(10) Patent No.: US 7,163,985 B2
(45) Date of Patent: Jan. 16, 2007

(54) POLYMER SYSTEMS AND CLEANING COMPOSITIONS COMPRISING THE SAME

(75) Inventors: Rafael Ortiz, Milford, OH (US); Jeffrey John Scheibel, Loveland, OH (US); Eugene Steven Sadlowski, Cincinnati, OH (US); Veronique Sylvie Metrot, Brussels (BE)

(73) Assignee: The Procter & Gamble Co., Cincinnati, OH (US)

( * ) Notice: Subject to any disclaimer, the term of this patent is extended or adjusted under 35 U.S.C. 154(b) by 346 days.

(21) Appl. No.: 10/661,317

(22) Filed: Sep. 12, 2003

(65) Prior Publication Data

US 2004/0068051 A1 Apr. 8, 2004

Related U.S. Application Data

(60) Provisional application No. 60/410,093, filed on Sep. 12, 2002.

(51) Int. Cl.
*C08F 283/06* (2006.01)
*C08F 85/02* (2006.01)
*C08L 43/02* (2006.01)
*C08L 33/02* (2006.01)

(52) U.S. Cl. ...................... 525/404; 510/461; 510/467; 510/475; 510/476; 510/477; 510/499; 525/188; 525/189; 525/326.1; 525/328.2; 525/328.5; 525/329.5; 525/329.7; 525/408; 525/409; 525/540

(58) Field of Classification Search ................ 525/540, 525/404, 408, 409, 188, 189; 510/461, 467, 510/475, 476, 477, 499
See application file for complete search history.

(56) References Cited

U.S. PATENT DOCUMENTS

| | | | |
|---|---|---|---|
| 3,642,572 | A | 2/1972 | Endres et al. |
| 4,144,123 | A | 3/1979 | Scharf et al. |
| 4,371,674 | A | 2/1983 | Hertel et al. |
| 5,451,341 | A | 9/1995 | White |
| 5,565,145 | A | 10/1996 | Watson et al. |
| 5,858,348 | A | 1/1999 | Matsuda et al. |
| 6,004,922 | A | 12/1999 | Watson et al. |
| 6,008,181 | A | 12/1999 | Cripe et al. |
| 6,015,781 | A | 1/2000 | Vinson et al. |
| 6,020,303 | A | 2/2000 | Cripe et al. |
| 6,046,152 | A | 4/2000 | Vinson et al. |
| 6,057,278 | A | 5/2000 | Gosselink et al. |
| 6,060,443 | A | 5/2000 | Cripe et al. |
| 6,066,612 | A | 5/2000 | Murata et al. |
| 6,071,871 | A | 6/2000 | Gosselink et al. |
| 6,075,000 | A | 6/2000 | Rohrbaugh et al. |
| 6,087,316 | A | 7/2000 | Watson et al. |
| 6,093,856 | A | 7/2000 | Cripe et al. |
| 6,121,226 | A | 9/2000 | Gosselink et al. |
| 6,133,222 | A | 10/2000 | Vinson et al. |
| 6,153,577 | A | 11/2000 | Cripe et al. |
| 6,191,093 | B1 | 2/2001 | Watson et al. |
| 6,228,829 | B1 | 5/2001 | Vinson et al. |
| 6,232,282 | B1 | 5/2001 | Kvietok et al. |
| 6,242,406 | B1 | 6/2001 | Katsuda et al. |
| 6,274,540 | B1 | 8/2001 | Scheibel et al. |
| 6,281,181 | B1 | 8/2001 | Vinson et al. |
| 6,291,415 | B1 | 9/2001 | Watson et al. |
| 6,306,817 | B1 | 10/2001 | Kott et al. |
| 6,326,348 | B1 | 12/2001 | Vinson et al. |
| 6,369,024 | B1 | 4/2002 | Panandiker et al. |
| 6,380,143 | B1 | 4/2002 | Kvietok et al. |
| 6,444,633 | B1 | 9/2002 | Price |
| 6,448,213 | B1 | 9/2002 | Willman |
| 6,472,359 | B1 | 10/2002 | Ghosh |
| 6,479,451 | B1 | 11/2002 | Price |
| 6,482,789 | B1 | 11/2002 | Kvietok et al. |
| 6,498,134 | B1 | 12/2002 | Vinson et al. |
| 6,506,717 | B1 | 1/2003 | Kott et al. |
| 6,525,012 | B1 | 2/2003 | Price et al. |
| 6,566,319 | B1 | 5/2003 | Scheibel et al. |

FOREIGN PATENT DOCUMENTS

| | | |
|---|---|---|
| EP | 0 122 593 | 7/1989 |
| EP | 0 269 169 B1 | 8/1992 |
| GB | 2 039 938 | 8/1980 |
| WO | WO 97/23546 | 7/1997 |
| WO | WO 97/42283 | 11/1997 |
| WO | WO 97/42284 | 11/1997 |
| WO | WO 97/42286 | 11/1997 |
| WO | WO 97/42287 | 11/1997 |
| WO | WO 98/15607 | 4/1998 |
| WO | WO 98/20098 | 5/1998 |
| WO | WO 99/19429 A | 4/1999 |
| WO | WO 99/19444 | 4/1999 |
| WO | WO 00/23548 | 4/2000 |
| WO | WO 00/23549 | 4/2000 |
| WO | WO 00/43473 | 7/2000 |
| WO | WO 00/43478 | 7/2000 |
| WO | WO 01/05923 A1 | 1/2001 |
| WO | WO 01/05924 A1 | 1/2001 |
| WO | WO 01/34739 | 5/2001 |
| WO | WO 01/34748 | 5/2001 |
| WO | WO 01/62881 A2 | 8/2001 |
| WO | WO 01/62884 | 8/2001 |
| WO | WO 02/092737 | 11/2002 |

*Primary Examiner*—Ana Woodward
(74) *Attorney, Agent, or Firm*—Stephen T. Murphy; Kim William Zerby; Steven T. Miller

(57) ABSTRACT

The present invention relates to stable polymer systems comprising anionic and modified polyamine polymers. When such polymer systems are employed in cleaning compositions, such cleaning compositions exhibit unexpectedly improved anti-soil re-deposition and situs whitening capabilities.

3 Claims, No Drawings

POLYMER SYSTEMS AND CLEANING COMPOSITIONS COMPRISING THE SAME

CROSS REFERENCE TO RELATED APPLICATIONS

This application claims the benefit under 35 USC 119 (e) to U.S. Application Ser. No. 60/410,093, filed Sep. 12, 2002.

FIELD OF INVENTION

The present invention relates to polymer systems comprising anionic and modified polyamine polymers, cleaning compositions comprising polymer systems and methods of cleaning surfaces and fabrics using such cleaning compositions.

BACKGROUND OF THE INVENTION

It is known that when anionic and cationic or zwitterionic polymers are placed in intimate contact, in solid or solution form, the opposite charges of such materials reduce product stability. For example, in liquid cleaning compositions combining anionic and cationic or zwitterionic polymers typically results in phase separation. Not being bound by theory, it is believed that combining two molecules of opposite charge generally leads to a decrease in hydrophilicity and solvation by water that results in precipitation. As a result, polymer systems wherein anionic and cationic or zwitterionic polymers are in intimate contact are generally not employed in fields such as the field of cleaning compositions.

Surprisingly, Applicants discovered that certain combinations of anionic and cationic or zwitterionic polymers are in fact stable when placed in intimate contact. Furthermore, Applicants discovered that when such polymer systems are employed in cleaning compositions, such cleaning compositions exhibit unexpectedly improved anti-soil re-deposition and whitening properties.

SUMMARY OF THE INVENTION

The present invention relates to polymer systems comprising an anionic polymer and a modified polyamine polymer. The present invention further relates to cleaning compositions comprising such polymer systems and methods of using such cleaning compositions to clean a situs such as a fabric or hard surface.

DETAILED DESCRIPTION OF THE INVENTION

The present invention relates to polymer systems comprising anionic and modified polyamine polymers, cleaning compositions comprising polymer systems and methods of cleaning surfaces and fabrics using such cleaning compositions.

Definitions and Test Methods

As used herein the term weight-average molecular weight is the weight-average molecular weight as determined using gel permeation chromatography according to the protocol found in Colloids and Surfaces A. Physico Chemical & Engineering Aspects, Vol. 162, 2000, pg. 107–121.

As used herein, the articles a and an when used herein, for example, “an anionic polymer” or “a modified polyamine” is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

All documents cited are, in relevant part, incorporated herein by reference; the citation of any document is not to be construed as an admission that it is prior art with respect to the present invention.

Polymer Systems

Applicants' polymer systems comprise an anionic polymer and a modified polyamine polymer. In Applicants' polymers systems, the ratio of anionic polymer to modified polyamine polymer may be from about 1:20 to about 20:1. In another aspect of Applicants' invention the ratio of anionic polymer to modified polyamine polymer may be from about 1:10 to about 10:1. In still another aspect of Applicants' invention the ratio of anionic polymer to modified polyamine polymer may be from about 3:1 to about 1:3. In still another aspect of Applicants' invention the ratio of anionic polymer to modified polyamine polymer may be about 1:1.

Anionic Polymers

Suitable anionic polymers include random polymers, block polymers and mixtures thereof. Such polymers typically comprise first and a second moieties in a ratio of from about 100:1 to about 1:5. Suitable first moieties include moieties derived from monoethylenically unsaturated $C_3$–$C_8$ monomers comprising at least one carboxylic acid group, salts of such monomers, and mixtures thereof. Non-limiting examples of suitable monomers include monoethylenically unsaturated $C_3$–$C_8$ monocarboxylic acids and $C_4$–$C_8$ dicarboxylic acids selected from the group consisting of acrylic acid, methacrylic acid, beta-acryloxypropionic acid, vinyl acetic acid, vinyl propionic acid, crotonic acid, ethacrylic acid, alpha-chloro acrylic acid, alpha-cyano acrylic acid, maleic acid, maleic anhydride, fumaric acid, itaconic acid, citraconic acid, mesaconic acid, methylenemalonic acid, their salts, and mixtures thereof. In one aspect of Applicants' invention, suitable first moieties comprise monomers that are entirely selected from the group consisting of: acrylic acid, methacrylic acid, maleic acid and mixtures thereof.

Suitable second moieties include:

1.) Moieties derived from modified unsaturated monomers having the formulae R—Y-L and R-Z wherein:
   - a.) R is selected from the group consisting of C(X)H═C($R^1$)— where
     - (i) $R^1$ is H, or $C_1$–$C_4$ alkyl; and
     - (ii) X is H, $CO_2H$, or $CO_2R_2$ wherein $R_2$ is hydrogen, alkali metals, alkaline earth metals, ammonium and amine bases, saturated $C_1$–$C_{20}$ alkyl, $C_6$–$C_{12}$ aryl, and $C_7$–$C_{20}$ alkylaryl;
   - b.) Y is selected from the group consisting of —$CH_2$—, —$CO_2$—, —OCO—, and —CON($R^a$)—, —$CH_2OCO$—; wherein $R^a$ is H or $C_1$–$C_4$ alkyl;
   - c.) L is selected from the group consisting of hydrogen, alkali metals, alkaline earth metals, ammonium and amine bases, saturated $C_1$–$C_{20}$ alkyl, $C_6$–$C_{12}$ aryl, and $C_7$–$C_{20}$ alkylaryl; and d.) Z is selected from the group consisting of $C_6$–$C_{12}$ aryl and $C_7$–$C_{12}$ arylalkyl.

In another aspect of Applicants' invention:

a.) R is selected from the group consisting of C(X)H═C($R^1$)— where (i) $R^1$ is H and (ii) X is H, or $CO_2H$;

b.) Y is —$CO_2$—;

c.) L is selected from the group consisting of hydrogen, alkali metals, $C_6$–$C_{12}$ aryl, and $C_7$–$C_{20}$ alkylaryl; and d.) Z is selected from the group consisting of $C_6$–$C_{12}$ aryl and $C_7$–$C_{12}$ arylalkyl.

In still another aspect of Applicants' invention the variables R, $R^1$, Y, L and Z are as described immediately above and the variable X is H.

Suitable anionic polymers comprising such first and second moieties typically have weight-average molecular weights of from about 1000 Da to about 100,000 Da. Examples of such polymers include, Alcosperse® 725 and Alcosperse® 747 available from Alco Chemical of Chattanooga, Tenn. U.S.A. and Acusol® 480N from Rohm & Haas Co. of Spring House, Pa. U.S.A.

Another class of suitable second moiety includes moieties derived from ethylenically unsaturated monomers containing from 1 to 100 repeat units selected from the group consisting of $C_1$–$C_4$ carbon alkoxides and mixtures thereof. An example of such an unsaturated monomer is represented by the formula J-G-D wherein:

1.) J is selected from the group consisting of C(X)H═C($R_1$)— wherein a.) $R_1$ is H, or $C_1$–$C_4$ alkyl;

b.) X is H, $CO_2H$, or $CO_2R_2$ wherein $R_2$ is hydrogen, alkali metals, alkaline earth metals, ammonium and amine bases, saturated $C_2$–$C_{20}$ alkyl, $C_6$–$C_{12}$ aryl, $C_7$–$C_{20}$ alkylaryl;

2.) G is selected from the group consisting of $C_1$–$C_4$ alkyl, —O—, —$CH_2O$—, —$CO_2$—.

3.) D is selected from the group consisting of a.) —$CH_2CH(OH)CH_2O(R^3O)_dR_4$;

b.) —$CH_2CH[O(R^3O)_dR^4]CH_2OH$;

c.) —$CH_2CH(OH)CH_2NR^5(R^3O)_dR^4$;

d.) —$CH_2CH[NR^5(R^3O)_dR^4]CH_2OH$, and mixtures thereof; wherein $R^3$ is selected from the group consisting of ethylene, 1,2-propylene, 1,3-propylene, 1,2-butylene, 1,4-butylene, and mixtures thereof;

$R^4$ is a capping unit selected from the group consisting of H, $C_1$–$C_4$ alkyl, $C_6$–$C_{12}$ aryl and $C_7$–$C_{20}$ alkylaryl;

$R^5$ is selected from the group consisting of H, $C_1$–$C_4$ alkyl $C_6$–$C_{12}$ aryl and $C_7$–$C_{20}$ alkylaryl; and subscript index d is an integer from 1 to 100.

In another aspect of Applicants' invention:

1.) J is selected from the group consisting of C(X)H═C($R_1$)— wherein a.) $R_1$ is H, or $C_1$–$C_4$ alkyl;

b.) X is H or $CO_2H$;

2.) G is selected from the group consisting of —O—, —$CH_2O$—, —$CO_2$—.

3.) D is selected from the group consisting of a.) —$CH_2CH(OH)CH_2O(R^3O)_dR_4$;

b.) —$CH_2CH[O(R^3O)_dR^4]CH_2OH$, and mixtures thereof; wherein $R^3$ is ethylene;

$R^4$ is a capping unit selected from the group consisting of H, and $C_1$–$C_4$ alkyl; and d is an integer from 1 to 100.

In still another aspect of Applicants' invention the variables J, D, $R^3$ and d are as described immediately above and the variables $R_1$ and X are H, G is —$CO_2$— and $R^4$ is $C_1$–$C_4$ alkyl.

Suitable anionic polymers comprising such first and second moieties typically have weight-average molecular weights of from about 2000 Da to about 100,000 Da. Examples of such polymers include the IMS polymer series supplied by Nippon Shokubai Co., Ltd of Osaka, Japan.

Other suitable anionic polymers include graft co-polymers that comprise the first moieties previously described herein, and typically have weight-average molecular weights of from about 1000 Da to about 50,000 Da. In such polymers, the aforementioned first moieties are typically grafted onto a $C_1$–$C_4$ carbon polyalkylene oxide. Examples of such polymers include the PLS series from Nippon Shokubai Co., Ltd of Osaka, Japan.

Other suitable anionic polymers include Sokalan® ES 8305, Sokalan® HP 25, and Densotan® A all supplied by BASF Corporation of New Jersey, U.S.A.

Modified Polyamines

Applicants' polymer system requires a suitable modified polyamine polymer or mixture of suitable polyamine polymers. Suitable modified polyamines include modified polyamines having the formulae:

$$V_{(n+1)}W_mY_nZ$$

or $$V_{(n-k+1)}W_mY_nY'_kZ$$

wherein m is an integer from 0 to about 400; n is an integer from 0 to about 400; k is less than or equal to n wherein i) V units are terminal units having the formula:

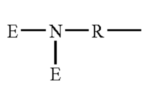 or 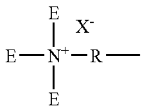 or 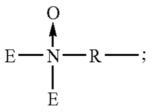

ii) W units are backbone units having the formula:

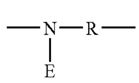 or 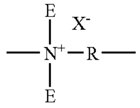 or 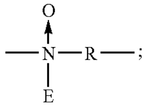

iii) Y and Y' units are branching units having the formula:

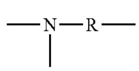 or 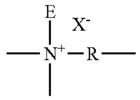 or

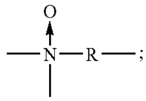 ; and iv) Z units are terminal units having the formula:

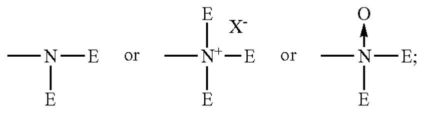

wherein:

R units are selected from the group consisting of $C_2$–$C_{12}$ alkylene, $C_4$–$C_{12}$ alkenylene, $C_3$–$C_{12}$ hydroxyalkylene, $C_4$–$C_{12}$ dihydroxy-alkylene, $C_8$–$C_{12}$ dialkylarylene, $—(R^1O)_xR^1—$, $—(R^1O)_xR^5(OR^1)_x—$, $—(CH_2CH(OR^2)CH_2O)_z—(R^1O)_yR^1(OCH_2CH(OR^2)CH_2)_w—$, $—C(O)(R^4)_rC(O)—$, $—CH_2CH(OR^2)CH_2—$, and mixtures thereof; wherein $R^1$ is $C_2$–$C_3$ alkylene and mixtures thereof;

$R^2$ is hydrogen, $—(R^1O)_xB$, and mixtures thereof;

wherein at least one B is selected from the group consisting of $—(CH_2)_q—SO_3M$, $—(CH_2)_pCO_2M$, $—(CH_2)_q(CHSO_3M)CH_2SO_3M$, $—(CH_2)_q—(CHSO_2M)CH_2SO_3M$, $—(CH_2)_pPO_3M$, $—PO_3M$, and mixtures thereof, and any remaining B moieties are selected from the group consisting of hydrogen, $C_1$–$C_6$ alkyl, $—(CH_2)_q—SO_3M$, $—(CH_2)_pCO_2M$, $—(CH_2)_q(CHSO_3M)CH_2SO_3M$, $—(CH_2)_q—(CHSO_2M)CH_2SO_3M$, $—(CH_2)_pPO_3M$, $—PO_3M$, and mixtures thereof;

$R^4$ is $C_1$–$C_{12}$ alkylene, $C_4$–$C_{12}$ alkenylene, $C_8$–$C_{12}$ arylalkylene, $C_6$–$C_{10}$ arylene, and mixtures thereof;

$R^5$ is $C_1$–$C_{12}$ alkylene, $C_3$–$C_{12}$ hydroxy-alkylene, $C_4$–$C_{12}$ dihydroxyalkylene, $C_8$–$C_{12}$ dialkylarylene, $—C(O)—$, $—C(O)NHR^6NHC(O)—$, $—R^1(OR^1)—$, $—C(O)(R^4)_rC(O)—$, $—CH_2CH(OH)CH_2—$, $—CH_2CH(OH)CH_2O(R^1O)_yR^1—OCH_2CH(OH)CH_2—$, and mixtures thereof;

$R^6$ is $C_2$–$C_{12}$ alkylene or $C_6$–$C_{12}$ arylene;

X is a water soluble anion; provided at least one backbone nitrogen is quaternized or oxidized E units are selected from the group consisting of hydrogen, $C_1$–$C_{22}$ alkyl, $C_3$–$C_{22}$ alkenyl, $C_7$–$C_{22}$ arylalkyl, $C_2$–$C_{22}$ hydroxyalkyl, $—(CH_2)_pCO_2M$, $—(CH_2)_qSO_3M$, $—CH(CH_2CO_2M)—CO_2M$, $—(CH_2)_pPO_3M$, $—(R^1O)_xB$, $—C(O)R^3$, and mixtures thereof;

provided that when any E unit of a nitrogen is a hydrogen, said nitrogen is not also an N-oxide;

$R^1$ is $C_2$–$C_3$ alkylene and mixtures thereof;

$R^3$ is $C_1$–$C_{18}$ alkyl, $C_7$–$C_{12}$ arylalkyl, $C_7$–$C_{12}$ alkyl substituted aryl, $C_6$–$C_{12}$ aryl, and mixtures thereof;

at least one B is selected from the group consisting of $—(CH_2)_q—SO_3M$, $—(CH_2)_pCO_2M$, $—(CH_2)_q(CHSO_3M)CH_2SO_3M$, $—(CH2)_q—(CHSO_2M)CH_2SO_3M$, $—(CH_2)_pPO_3M$, $—PO_3M$, and mixtures thereof, and any remaining B moieties are selected from the group consisting of hydrogen, $C_1$–$C_6$ alkyl, $—(CH_2)_q—SO_3M$, $—(CH_2)_pCO_2M$, $—(CH_2)_q(CHSO_3M)CH_2SO_3M$, $—(CH_2)_q—(CHSO_2M)CH_2SO_3M$, $—(CH_2)_pPO_3M$, $—PO_3M$, and mixtures thereof;

M is hydrogen or a water soluble cation in sufficient amount to satisfy charge balance; and wherein the values for the following indices are as follows: subscript index p is an integer from 1 to 6; subscript index q is an integer from 0 to 6; subscript index r has the value of 0 or 1; subscript index w has the value 0 or 1; subscript index x is an integer from 1 to 100; subscript index y is an integer from 0 to 100; and subscript index z has the value 0 or 1.

In another embodiment of Applicants' invention the aforementioned variables are as follows:

R units are selected from the group consisting of $C_2$–$C_{12}$ alkylene, $—(R^1O)_xR^1—$, and mixtures thereof; wherein $R^1$ is $C_2$–$C_3$ alkylene and mixtures thereof;

X is a water soluble anion; provided at least one backbone nitrogen is quaternized or oxidized E units are $—(R^1O)_xB$ wherein $R^1$ is $C_2$–$C_3$ alkylene and mixtures thereof; and B is hydrogen, $—(CH_2)_q—SO_3M$, $—(CH_2)_pCO_2M$, and mixtures thereof;

M is hydrogen or a water soluble cation in sufficient amount to satisfy charge balance; and subscript p is an integer from 1 to 6; subscript q is 0; subscript r has the value of 0 or 1; subscript w has the value 0 or 1; subscript x is an integer from 1 to 100; subscript y is an integer from 0 to 100; and subscript z has the value 0 or 1.

In still another aspect of Applicants' invention all variables are as described immediately above except B is hydrogen, $—(CH_2)_q—SO_3M$, and mixtures thereof.

Additional suitable modified polyamines include modified polyamines having formula (I):

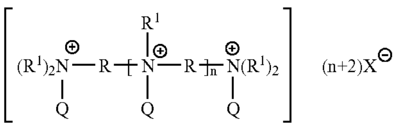

(I)

wherein R is $C_6$–$C_{20}$ linear or branched alkylene, and mixtures thereof; X in formula (I) is an anion present in sufficient amount to provide electronic neutrality; n and subscript index n in formula (I) have equal values and are integers from 0 to 4; $R^1$ in formula (I) is a capped polyalkyleneoxy unit having formula (II):

$$—(R^2O)_x—R^3 \qquad \text{(II)}$$

wherein $R^2$ in formula (II) is $C_2$–$C_4$ linear or branched alkylene, and mixtures thereof; subscript index x in formula (II) describes the average number of alkyleneoxy units attached to the backbone nitrogen, such index has a value from about 1 to about 50, in another aspect of Applicants' invention such index has a value from about 15 to about 25; at least one $R^3$ moiety in formula (II) is an anionic capping unit, with the remaining $R^3$ moieties in formula (II) selected from the group comprising hydrogen, $C_1$–$C_{22}$ alkylenearyl, an anionic capping unit, a neutral capping unit, and mixtures thereof; at least one Q moiety, in formula (I) is a hydrophobic quaternizing unit selected from the group comprising $C_7$–$C_{30}$ substituted or unsubstituted alkylenearyl, and mixtures thereof, any remaining Q moieties in formula (I) are selected from the group comprising lone pairs of electrons on the unreacted nitrogens, hydrogen, $C_1$–$C_{30}$ substituted or unsubstituted linear or branched alkyl, or $C_3$–$C_{30}$ substituted or unsubstituted cycloalkyl, and mixtures thereof.

In still another aspect of Applicants' invention all variables for Formula I and II are the same except R in Formula I is $C_6$–$C_{20}$ linear alkylene, and mixtures thereof; and $R^2$ in formula (II) is $C_2$–$C_4$ linear alkylene, and mixtures thereof;

Examples of suitable modified polyamines include modified polyamines having the following structures. As with all polymers containing alkyleneoxy units it is understood that only an average number or statistical distribution of alkyleneoxy units will be known. Therefore, depending upon how "tightly" or how "exactly" a polyamine is alkoxylated, the average value may vary from embodiment to embodiment.

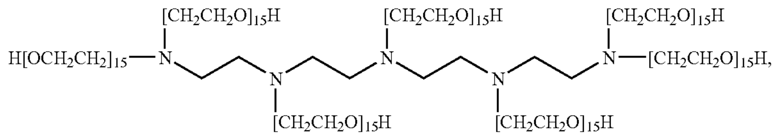
,
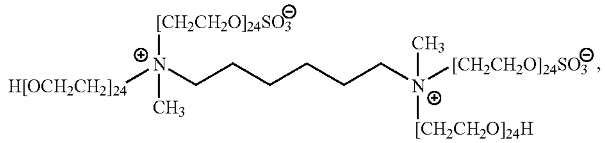
,
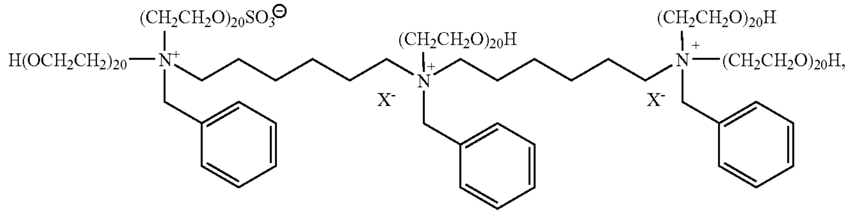
,
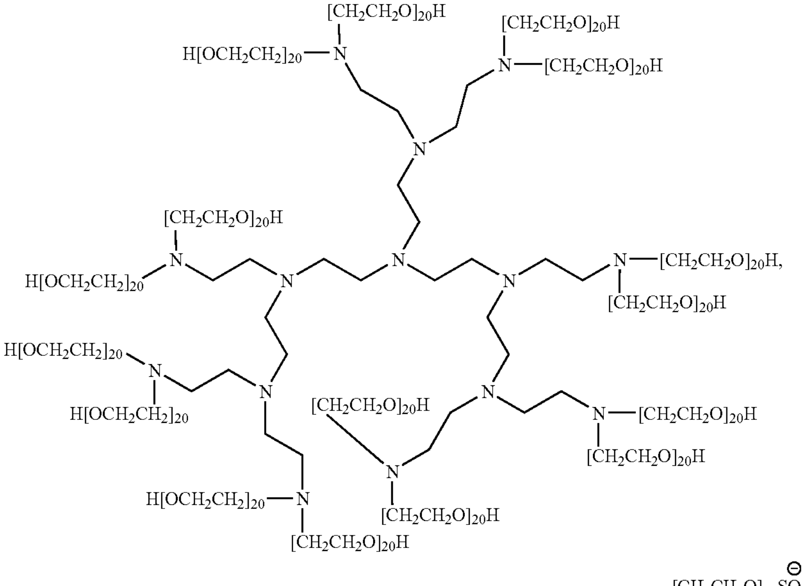
,
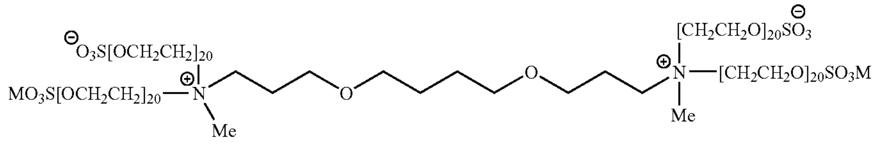

Suitable modified polyamines, as disclosed herein, may be produced in accordance with the processes and methods disclosed in Applicants examples.

Cleaning Compositions

Applicants' cleaning compositions include, but are not limited to, liquids, solids, including powders and granules, pastes and gels. Such cleaning compositions typically comprise from about 0.01% to about 50% of Applicants' polymer system. In another aspect of Applicants' invention, such cleaning compositions comprise from about 0.1% to about 25% of Applicants' polymer system. In still another aspect of Applicants' invention such cleaning compositions comprise from about 0.1% to about 5% of Applicants' polymer system. In still another aspect of Applicants' invention such cleaning compositions comprise from about 0.1% to about 3% of Applicants' polymer system.

The cleaning composition of the present invention may be advantageously employed for example, in laundry applications, hard surface cleaning, automatic dishwashing applications, as well as cosmetic applications such as dentures, teeth, hair and skin.

Embodiments may comprise a pill, tablet, gelcap or other single dosage unit such as pre-measured powders or liquids. A filler or carrier material may be included to increase the volume of such embodiments. Suitable filler or carrier materials include, but are not limited to, various salts of sulfate, carbonate and silicate as well as talc, clay and the like. Filler or carrier materials for liquid compositions may be water or low molecular weight primary and secondary alcohols including polyols and diols. Examples of such alcohols include, but are not limited to, methanol, ethanol, propanol and isopropanol. Monohydric alcohols may also be employed. The compositions may contain from about 5% to about 90% of such materials. Acidic fillers can be used to reduce pH.

The cleaning compositions herein may be formulated such that, during use in aqueous cleaning operations, the wash water will have a pH of between about 6.5 and about 11, or in another aspect of Applicants' invention, a pH between about 7.5 and about 10.5. Liquid dishwashing product formulations typically have a pH between about 6.8 and about 9.0. Laundry products are typically at pH 9–11. Techniques for controlling pH at recommended usage levels include the use of buffers, alkalis, acids, etc., and are well known to those skilled in the art.

Adjunct Materials

While not essential for the purposes of the present invention, the non-limiting list of adjuncts illustrated hereinafter are suitable for use in the instant cleaning compositions and may be desirably incorporated in preferred embodiments of the invention, for example to assist or enhance cleaning performance, for treatment of the substrate to be cleaned, or to modify the aesthetics of the cleaning composition as is the case with perfumes, colorants, dyes or the like. The precise nature of these additional components, and levels of incorporation thereof, will depend on the physical form of the composition and the nature of the cleaning operation for which it is to be used. Suitable adjunct materials include, but are not limited to, surfactants, builders, chelating agents, dye transfer inhibiting agents, dispersants, enzymes, and enzyme stabilizers, catalytic metal complexes, polymeric dispersing agents, clay soil removal/anti-redeposition agents, brighteners, suds suppressors, dyes, perfumes, structure elasticizing agents, fabric softeners, carriers, hydrotropes, organic catalysts, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

Surfactants—the cleaning compositions according to the present invention may comprise a surfactant or surfactant system comprising surfactants selected from nonionic and/or anionic and/or cationic surfactants and/or ampholytic and/or zwitterionic and/or semi-polar nonionic surfactants or mixtures thereof. Non-limiting examples of anionic surfactants include, mid-chain branched alkyl sulfates, modified linear alkyl benzene sulfonates, alkylbenzene sulfonates, linear and branched chain alkyl sulfates, linear and branched chain alkyl alkoxy sulfates, and fatty carboxylates. Non-limiting examples of nonionic surfactants include alkyl ethoxylates, alkylphenol ethoxylates, and alkyl glycosides. Other suitable surfactants include amine oxides, quaternery ammonium surfactants, and amidoamines.

Applicants' liquid laundry detergent embodiments may employ surfactant systems having a Hydrophilic Index (HI) of at least 6.5. For an individual surfactant component HI is defined as follows: HI=0.2*(MW of hydrophile)/(MW of hydrophile+MW of hydrophobe). Where: MW is the molecular weight of the hydrophilic or hydrophobic portion of the surfactant. For ionic surfactants the hydrophile is considered to be the hydrophilic portion of the surfactant molecule without the counterion. The Hydrophilic Index of a surfactant composition is the weighted average of the Hydrophilic Indices of the individual surfactant components.

A surfactant or surfactant system is typically present at a level of from about 0.1%, preferably about 1%, more preferably about 5% by weight of the cleaning compositions to about 99.9%, preferably about 80%, more preferably about 35%, most preferably 30% about by weight of the cleaning compositions.

Builders—The cleaning compositions of the present invention preferably comprise one or more detergent builders or builder systems. When present, the compositions will typically comprise at least about 1% builder, preferably from about 5%, more preferably from about 10% to about 80%, preferably to about 50%, more preferably to about 30% by weight, of detergent builder.

Builders include, but are not limited to, the alkali metal, ammonium and alkanolammonium salts of polyphosphates, alkali metal silicates, alkaline earth and alkali metal carbonates, aluminosilicate builders polycarboxylate compounds ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The cleaning compositions herein may also optionally contain one or more copper, iron and/or manganese chelating agents.

If utilized, these chelating agents will generally comprise from about 0.1% by weight of the cleaning compositions herein to about 15%, more preferably 3.0% by weight of the cleaning compositions herein.

Dye Transfer Inhibiting Agents—The cleaning compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof.

When present in the cleaning compositions herein, the dye transfer inhibiting agents are present at levels from about 0.0001%, more preferably about 0.01%, most preferably about 0.05% by weight of the cleaning compositions to about 10%, more preferably about 2%, most preferably about 1% by weight of the cleaning compositions.

Enzymes—The cleaning compositions can comprise one or more detergent enzymes which provide cleaning performance and/or fabric care benefits. Examples of suitable enzymes include, but are not limited to, hemicellulases, peroxidases, proteases such as "Protease B" which is described in EP 0 251 446, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases such as Natalase which is described in WO 95/26397 and WO 96/23873. Natalase and Protease B are particularly useful in liquid cleaning compositions. A preferred combination is a cleaning composition having a cocktail of conventional applicable enzymes like protease, lipase, cutinase and/or cellulase in conjunction with amylase.

Enzyme Stabilizers—Enzymes for use in detergents can be stabilized by various techniques. The enzymes employed herein can be stabilized by the presence of water-soluble sources of calcium and/or magnesium ions in the finished compositions that provide such ions to the enzymes.

Catalytic Metal Complexes—Applicants' cleaning compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430,243 Bragg, issued Feb. 2, 1982.

If desired, the compositions herein can be catalyzed by means of a manganese compound. Such compounds and levels of use are well known in the art and include, for example, the manganese-based catalysts disclosed in U.S. Pat. No. 5,576,282 Miracle et al. Preferred examples of these catalysts include $Mn^{IV}_2(u\text{-}O)_3$(1,4,7-trimethyl-1,4,7-triazacyclononane)$_2(PF_6)_2$, $Mn^{III}_2(u\text{-}O)_1(u\text{-}OAc)_2$(1,4,7-trimethyl-1,4,7-triazacyclononane)$_2(ClO_4)_2$, $Mn^{IV}_4(u\text{-}O)_6$(1,4,7-triazacyclononane)$_4(ClO_4)_4$, $Mn^{III}Mn^{IV}_4(u\text{-}O)_1(u\text{-}OAc)_2$-(1,4,7-trimethyl-1,4,7-triazacyclononane)$_2(ClO_4)_3$, $Mn^{IV}$(1,4,7-trimethyl-1,4,7-triazacyclononane)-$(OCH_3)_3(PF_6)$, and mixtures thereof.

Cobalt bleach catalysts useful herein are known, and are described, for example, in U.S. Pat. No. 5,597,936 Perkins et al., issued Jan. 28, 1997; U.S. Pat. No. 5,595,967 Miracle et al., Jan. 21, 1997. The most preferred cobalt catalyst useful herein are cobalt pentaamine acetate salts having the formula $[Co(NH_3)_5OAc]T_y$, wherein "OAc" represents an acetate moiety and "$T_y$" is an anion, and especially cobalt pentaamine acetate chloride, $[Co(NH_3)_5OAc]Cl_2$; as well as $[Co(NH_3)_5OAc](OAc)_2$; $[Co(NH_3)_5OAc](PF_6)_2$; $[Co(NH_3)_5OAc](SO_4)$; $[Co\text{—}(NH_3)_5OAc](BF_4)_2$; and $[Co(NH_3)_5OAc](NO_3)_2$ (herein "PAC"). Such cobalt catalysts are readily prepared by known procedures, such as taught for example in U.S. Pat. No. 5,597,936, and U.S. Pat. No. 5,595,967.

Compositions herein may also suitably include a transition metal complex of a macropolycyclic rigid ligand—abbreviated as "MRL". As a practical matter, and not by way of limitation, the compositions and cleaning processes herein can be adjusted to provide on the order of at least one part per hundred million of the active MRL species in the aqueous washing medium, and will preferably provide from about 0.005 ppm to about 25 ppm, more preferably from about 0.05 ppm to about 10 ppm, and most preferably from about 0.1 ppm to about 5 ppm, of the MRL in the wash liquor.

Suitable metals in the MRLs include Mn(II), Mn(III), Mn(IV), Mn(V), Fe(II), Fe(III), Fe(IV), Co(I), Co(II), Co(III), Ni(I), Ni(II), Ni(III), Cu(I), Cu(II), Cu(III), Cr(II), Cr(III), Cr(IV), Cr(V), Cr(VI), V(III), V(IV), V(V), Mo(IV), Mo(V), Mo(VI), W(IV), W(V), W(VI), Pd(II), Ru(II), Ru(III), and Ru(IV). Preferred transition-metals in the instant transition-metal bleach catalyst include manganese, iron and chromium.

Suitable MRL's herein comprise:

(a) at least one macrocycle main ring comprising four or more heteroatoms; and (b) a covalently connected non-metal superstructure capable of increasing the rigidity of the macrocycle, preferably selected from (i) a bridging superstructure, such as a linking moiety;

(ii) a cross-bridging superstructure, such as a cross-bridging linking moiety; and (iii) combinations thereof.

Preferred MRL's herein are a special type of ultra-rigid ligand that is cross-bridged. A "cross-bridge" is non-limitingly illustrated in FIG. 1 herein below. FIG. 1 illustrates a cross-bridged, substituted (all nitrogen atoms tertiary) derivative of cyclam. The cross-bridge is a $\text{—}CH_2CH_2\text{—}$ moiety that bridges $N^1$ and $N^8$.

FIG. 1

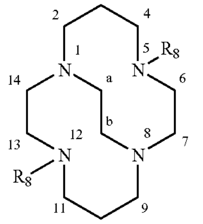

When each $R_8$ is ethyl, this ligand is named, 5,12-diethyl-1,5,8,12-tetraazabicyclo[6.6.2]hexadecane.

Transition-metal bleach catalysts of MRLs that are suitable for use in Applicants' cleaning compositions are non-limitingly illustrated by any of the following:

Dichloro-5,12-diethyl-1,5,8,12-tetraazabicyclo[6.6.2]hexadecane Manganese(II)

Diaquo-5,12-diethyl-1,5,8,12-tetraazabicyclo[6.6.2]hexadecane Manganese(II) Hexafluorophosphate Aquo-hydroxy-5,12-diethyl-1,5,8,12-tetraazabicyclo[6.6.2]hexadecane Manganese(III) Hexafluorophosphate Diaquo-5,12-diethyl-1,5,8,12-tetraazabicyclo[6.6.2]hexadecane Manganese(II) Tetrafluoroborate Dichloro-5,12-diethyl-1,5,8,12-tetraazabicyclo[6.6.2]hexadecane Manganese(III) Hexafluorophosphate Dichloro-5,12-di-n-butyl-1,5,8,12-tetraazabicyclo[6.6.2]hexadecane Manganese(II)

Dichloro-5,12-dibenzyl-1,5,8,12-tetraazabicyclo[6.6.2]hexadecane Manganese(II)

Dichloro-5-n-butyl-12-methyl-1,5,8,12-tetraaza-bicyclo[6.6.2]hexadecane Manganese(II)

Dichloro-5-n-octyl-12-methyl-1,5,8,12-tetraaza-bicyclo[6.6.2]hexadecane Manganese(II)

Dichloro-5-n-butyl-12-methyl-1,5,8,12-tetraaza-bicyclo[6.6.2]hexadecane Manganese(II).

Suitable transition metal MRLs are readily prepared by known procedures, such as taught for example in WO 00/332601, and U.S. Pat. No. 6,225,464.

Organic Catalyst

Applicants' cleaning compositions may contain a catalytically effective amount of organic catalyst. As a practical matter, and not by way of limitation, the compositions and cleaning processes herein can be adjusted to provide on the order of at least 0.001 ppm of organic catalyst in the washing medium, and will preferably provide from about 0.001 ppm to about 500 ppm, more preferably from about 0.005 ppm to about 150 ppm, and most preferably from about 0.05 ppm to about 50 ppm, of organic catalyst in the wash liquor. In order to obtain such levels in the wash liquor, typical compositions herein will comprise from about 0.0002% to about 5%, more preferably from about 0.001% to about 1.5%, of organic catalyst, by weight of the cleaning compositions.

In addition to organic catalysts, cleaning compositions may comprise an activated peroxygen source. Suitable ratios of moles of organic catalyst to moles of activated peroxygen source include but are not limited to from about 1:1 to about 1:1000. Suitable activated peroxygen sources include, but are not limited to, preformed peracids, a hydrogen peroxide source in combination with a bleach activator, or a mixture thereof. Suitable preformed peracids include, but are not limited to, compounds selected from the group consisting of percarboxylic acids and salts, percarbonic acids and salts, perimidic acids and salts, peroxymonosulfuric acids and salts, and mixtures thereof. Suitable sources of hydrogen peroxide include, but are not limited to, compounds selected from the group consisting of perborate compounds, percarbonate compounds, perphosphate compounds and mixtures thereof.

Suitable bleach activators include, but are not limited to, tetraacetyl ethylene diamine (TAED), benzoylcaprolactam (BzCL), 4-nitrobenzoylcaprolactam, 3-chlorobenzoylcaprolactam, benzoyloxybenzenesulphonate (BOBS), nonanoyloxybenzenesulphonate (NOBS), phenyl benzoate (PhBz), decanoyloxybenzenesulphonate ($C_{10}$-OBS), benzoylvalerolactam (BZVL), octanoyloxybenzenesulphonate ($C_8$-OBS), perhydrolyzable esters, perhydrolyzable imides and mixtures thereof.

When present, hydrogen peroxide sources will typically be at levels of from about 1%, preferably from about 5% to about 30%, preferably to about 20% by weight of the composition. If present, peracids or bleach activators will typically comprise from about 0.1%, preferably from about 0.5% to about 60%, more preferably from about 0.5% to about 40% by weight of the bleaching composition.

In addition to the disclosure above, suitable types and levels of activated peroxygen sources are found in U.S. Pat. Nos. 5,576,282, 6,306,812 B1 and 6,326,348 B1 that are incorporated by reference.

Processes of Making and Using of Applicants' Cleaning Composition

The cleaning compositions of the present invention can be formulated into any suitable form and prepared by any process chosen by the formulator, non-limiting examples of which are described in U.S. Pat. No. 5,879,584 Bianchetti et al., issued Mar. 9, 1999; U.S. Pat. No. 5,691,297 Nassano et al., issued Nov. 11, 1997; U.S. Pat. No. 5,574,005 Welch et al., issued Nov. 12, 1996; U.S. Pat. No. 5,569,645 Dinniwell et al., issued Oct. 29, 1996; U.S. Pat. No. 5,565,422 Del Greco et al., issued Oct. 15, 1996; U.S. Pat. No. 5,516,448 Capeci et al., issued May 14, 1996; U.S. Pat. No. 5,489,392 Capeci et al., issued Feb. 6, 1996; U.S. Pat. No. 5,486,303 Capeci et al., issued Jan. 23, 1996 all of which are incorporated herein by reference.

Method of Use

The present invention includes a method for cleaning a situs inter alia a surface or fabric. Such method includes the steps of contacting an embodiment of Applicants' cleaning composition, in neat form or diluted in a wash liquor, with at least a portion of a surface or fabric then rinsing such surface or fabric. Preferably the surface or fabric is subjected to a washing step prior to the aforementioned rinsing step. For purposes of the present invention, washing includes but is not limited to, scrubbing, and mechanical agitation. As will be appreciated by one skilled in the art, the cleaning compositions of the present invention are ideally suited for use in laundry applications. Accordingly, the present invention includes a method for laundering a fabric. The method comprises the steps of contacting a fabric to be laundered with a said cleaning laundry solution comprising at least one embodiment of Applicants' cleaning composition, cleaning additive or mixture thereof. The fabric may comprise most any fabric capable of being laundered. The solution typically has a pH of from about 8 to about 10. The compositions are typically employed at concentrations of from about 500 ppm to about 10,000 ppm in solution. The water temperatures typically range from about 5° C. to about 60° C. The water to fabric ratio is typically from about 1:1 to about 30:1.

EXAMPLES

Example 1

Preparation of Ethoxylated Modified Polyethylene Imine Having an Average Backbone Molecular Weight of 600 Da and an Average Degree of Ethoxylation of 20

The ethoxylation is conducted in a 2 gallon stirred stainless steel autoclave equipped for temperature measurement and control, pressure measurement, vacuum and inert gas purging, sampling, and for introduction of ethylene oxide as a liquid. A ~20 lb. net cylinder of ethylene oxide (ARC) is set up to deliver ethylene oxide as a liquid by a pump to the autoclave with the cylinder placed on a scale so that the weight change of the cylinder could be monitored.

A 250 g portion of polyethyleneimine (PEI) (Nippon Shokubai, having a listed average molecular weight of 600 equating to about 0.417 moles of polymer and 6.25 moles of nitrogen functions) is added to the autoclave. The autoclave is then sealed and purged of air (by applying vacuum to minus 28" Hg followed by pressurization with nitrogen to 250 psia, then venting to atmospheric pressure). The autoclave contents are heated to 130° C. while applying vacuum. After about one hour, the autoclave is charged with nitrogen to about 250 psia while cooling the autoclave to about 105° C. Ethylene oxide is then added to the autoclave incrementally over time while closely monitoring the autoclave pressure, temperature, and ethylene oxide flow rate. The ethylene oxide pump is turned off and cooling is applied to limit any temperature increase resulting from any reaction exotherm. The temperature is maintained between 100 and 110° C. while the total pressure is allowed to gradually increase during the course of the reaction. After a total of 275 grams of ethylene oxide has been charged to the autoclave (roughly equivalent to one mole ethylene oxide per PEI nitrogen function), the temperature is increased to 110° C. and the autoclave is allowed to stir for an additional hour. At this point, vacuum is applied to remove any residual unreacted ethylene oxide.

Next, vacuum is continuously applied while the autoclave is cooled to about 50° C. while introducing 135 g of a 25% sodium methoxide in methanol solution (0.625 moles, to achieve a 10% catalyst loading based upon PEI nitrogen functions). The methoxide solution is sucked into the autoclave under vacuum and then the autoclave temperature controller setpoint is increased to 130° C. A device is used to monitor the power consumed by the agitator. The agitator power is monitored along with the temperature and pressure.

Agitator power and temperature values gradually increase as methanol is removed from the autoclave and the viscosity of the mixture increases and stabilizes in about 1 hour indicating that most of the methanol has been removed. The mixture is further heated and agitated under vacuum for an additional 30 minutes.

Vacuum is removed and the autoclave is cooled to 105° C. while it is being charged with nitrogen to 250 psia and then vented to ambient pressure. The autoclave is charged to 200 psia with nitrogen. Ethylene oxide is again added to the autoclave incrementally as before while closely monitoring the autoclave pressure, temperature, and ethylene oxide flow rate while maintaining the temperature between 100 and 110° C. and limiting any temperature increases due to reaction exotherm. After the addition of approximately 5225 g of ethylene oxide (resulting in a total of 20 moles of ethylene oxide per mole of PEI nitrogen function) is achieved over several hours, the temperature is increased to 110° C. and the mixture stirred for an additional hour.

The reaction mixture is then collected in nitrogen purged containers and eventually transferred into a 22 L three neck round bottomed flask equipped with heating and agitation. The strong alkali catalyst is neutralized by adding 60 g methanesulfonic acid (0.625 moles). The reaction mixture is then deodorized by passing about 100 cu. ft. of inert gas (argon or nitrogen) through a gas dispersion frit and through the reaction mixture while agitating and heating the mixture to 130° C.

The final reaction product is cooled slightly and collected in glass containers purged with nitrogen.

In other preparations the neutralization and deodorization is accomplished in the reactor before discharging the product.

Example 2

Preparation of Ethoxylated, Quaternized 4,9-Dioxa-1,12-Dodecanediamine, Quaternized to About 90%, and Sulfated to About 90% and Ethoxylated to an Average Degree of Ethoxylation of 20 Ethoxy Units Per NH Unit 1. Ethoxylation of 4,9-dioxa-1,12-dodecanediamine to an average of 20 ethoxylations per backbone NH unit: The ethoxylation is conducted in a 2 gallon stirred stainless steel autoclave equipped for temperature measurement and control, pressure measurement, vacuum and inert gas purging, sampling, and for introduction of ethylene oxide as a liquid. A ~20 lb. net cylinder of ethylene oxide is set up to deliver ethylene oxide as a liquid by a pump to the autoclave with the cylinder placed on a scale so that the weight change of the cylinder can be monitored. A 200 g portion of 4,9-dioxa-1,12-dodecanediamine ("DODD", m.w. 204.32, 97%, 0.95 moles, 1.9 moles N, 3.8 moles ethoxylatable NH's) is added to the autoclave. The autoclave is then sealed and purged of air (by applying vacuum to minus 28" Hg followed by pressurization with nitrogen to 250 psia, then venting to atmospheric pressure). The autoclave contents are heated to 80° C. while applying vacuum. After about one hour, the autoclave is charged with nitrogen to about 250 psia while cooling the autoclave to about 105° C. Ethylene oxide is then added to the autoclave incrementally over time while closely monitoring the autoclave pressure, temperature, and ethylene oxide flow rate. The ethylene oxide pump is turned off and cooling is applied to limit any temperature increase resulting from any reaction exotherm. The temperature is maintained between 100 and 110° C. while the total pressure is allowed to gradually increase during the course of the reaction. After a total of 167 grams of ethylene oxide (3.8 moles) has been charged to the autoclave, the temperature is increased to 110° C. and the autoclave is allowed to stir for an additional 2 hours. At this point, vacuum is applied to remove any residual unreacted ethylene oxide.

Vacuum is continuously applied while the autoclave is cooled to about 50° C. while introducing 41 g of a 25% sodium methoxide in methanol solution (0.19 moles, to achieve a 10% catalyst loading based upon DODD nitrogen functions). The methanol from the methoxide solution is removed from the autoclave under vacuum and then the autoclave temperature controller setpoint is increased to 100° C. A device is used to monitor the power consumed by the agitator. The agitator power is monitored along with the temperature and pressure. Agitator power and temperature values gradually increase as methanol is removed from the autoclave and the viscosity of the mixture increases and stabilizes in about 1.5 hours indicating that most of the methanol has been removed. The mixture is further heated and agitated under vacuum for an additional 30 minutes.

Vacuum is removed and the autoclave is cooled to 105° C. while it is being charged with nitrogen to 250 psia and then vented to ambient pressure. The autoclave is charged to 200 psia with nitrogen. Ethylene oxide is again added to the autoclave incrementally as before while closely monitoring the autoclave pressure, temperature, and ethylene oxide flow rate while maintaining the temperature between 100 and 110° C. and limiting any temperature increases due to reaction exotherm. After the addition of 3177 g of ethylene oxide (72.2 mol, resulting in a total of 20 moles of ethylene oxide per mole of ethoxylatable sites on DODD), the temperature is increased to 110° C. and the mixture stirred for an additional 2 hours.

The reaction mixture is then collected into a 22 L three neck round bottomed flask purged with nitrogen. The strong alkali catalyst is neutralized by slow addition of 18.2 g methanesulfonic acid (0.19 moles) with heating (100° C.) and mechanical stirring. The reaction mixture is then purged of residual ethylene oxide and deodorized by sparging an inert gas (argon or nitrogen) into the mixture through a gas dispersion frit while agitating and heating the mixture to 120° C. for 1 hour. The final reaction product is cooled slightly and transferred to a glass container purged with nitrogen for storage.

2. Quaternization of 4,9-dioxa-1,12-dodecanediamine which is ethoxylated to an average of 20 ethoxylations per backbone NH unit: Into a weighed, 2000 ml, 3 neck round bottom flask fitted with argon inlet, condenser, addition funnel, thermometer, mechanical stirring and argon outlet (connected to a bubbler) is added DODD EO20 (561.2 g, 0.295 mol N, 98% active, m.w.-3724) and methylene chloride (1000 g) under argon. The mixture is stirred at room temperature until the polymer has dissolved. The mixture is then cooled to 5° C. using an ice bath. Dimethyl sulfate (39.5 g, 0.31 mol, 99%, m.w.-126.13) is slowly added using an addition funnel over a period of 15 minutes. The ice bath is removed and the reaction is allowed to rise to room temperature. After 48 hrs. the reaction is complete.

3. Sulfation of 4,9-dioxa-1,12-dodecanediamine which is quaternized to about 90% of the backbone nitrogens of the product admixture and which is ethoxylated to an average of 20 ethoxylations per backbone NH unit: Under argon, the reaction mixture from the quaternization step is cooled to 5° C. using an ice bath (DODD EO20, 90+mol % quat, 0.59 mol OH). Chlorosulfonic acid (72 g, 0.61 mol, 99%, mw-116.52) is slowly added using an addition funnel. The temperature of the reaction mixture is not allowed to rise above 10° C. The ice bath is removed and the reaction is allowed to rise to room temperature. After 6 hrs. the reaction is complete. The reaction is again cooled to 5° C. and sodium methoxide (264 g, 1.22 mol, Aldrich, 25% in methanol, m.w.-54.02) is slowly added to the rapidly stirred mixture. The temperature of the reaction mixture is not allowed to rise above 10° C. The reaction mixture is transferred to a single neck round bottom flask. Purified water (1300 ml) is added to the reaction mixture and the methylene chloride, methanol and some water is stripped off on a rotary evaporator at 50° C. The clear, light yellow solution is transferred to a bottle for storage. The final product pH is checked and adjusted to ~9 using 1N NaOH or 1N HCl as needed. Final weight ~1753 g.

Example 3

Preparation of Ethoxylated, Quaternized Bis(Hexamethylene)Triamine, Quaternized to About 90%, Sulfated to About 35% and Ethoxylated to an Average of 20 Ethoxy Units Per NH Unit 1. Ethoxylation of bis(hexamethylene)triamine: The ethoxylation is conducted in a 2 gallon stirred stainless steel autoclave equipped for temperature measurement and control, pressure measurement, vacuum and inert gas purging, sampling, and for introduction of ethylene oxide as a liquid. A ~20 lb. net cylinder of ethylene oxide is set up to deliver ethylene oxide as a liquid by a pump to the autoclave with the cylinder placed on a scale so that the weight change of the cylinder could be monitored.

A 200 g portion of bis(hexamethylene)triamine (BHMT) (M.W. 215.39, high purity 0.93 moles, 2.8 moles N, 4.65 moles ethoxylatable (NH) sites) is added to the autoclave. The autoclave is then sealed and purged of air (by applying vacuum to minus 28" Hg followed by pressurization with nitrogen to 250 psia, then venting to atmospheric pressure). The autoclave contents are heated to 80° C. while applying vacuum. After about one hour, the autoclave is charged with nitrogen to about 250 psia while cooling the autoclave to about 105° C. Ethylene oxide is then added to the autoclave incrementally over time while closely monitoring the autoclave pressure, temperature, and ethylene oxide flow rate. The ethylene oxide pump is turned on and off and cooling is applied to limit any temperature increase resulting from any reaction exotherm. The temperature is maintained between 100 and 110° C. while the total pressure is allowed to gradually increase during the course of the reaction. After a total of 205 grams of ethylene oxide (4.65 moles) has been charged to the autoclave, the temperature is increased to 110° C. and the autoclave is allowed to stir for an additional 2 hours. At this point, vacuum is applied to remove any residual unreacted ethylene oxide.

Vacuum is continuously applied while the autoclave is cooled to about 50° C. while introducing 60.5 g of a 25% sodium methoxide in methanol solution (0.28 moles, to achieve a 10% catalyst loading based upon BHMT nitrogen functions). The methanol from the methoxide solution is removed from the autoclave under vacuum and then the autoclave temperature controller setpoint is increased to 100° C. A device is used to monitor the power consumed by the agitator. The agitator power is monitored along with the temperature and pressure. Agitator power and temperature values gradually increase as methanol is removed from the autoclave and the viscosity of the mixture increases and stabilizes in about 1.5 hours indicating that most of the methanol has been removed. The mixture is further heated and agitated under vacuum for an additional 30 minutes.

Vacuum is removed and the autoclave is cooled to 105° C. while it is being charged with nitrogen to 250 psia and then vented to ambient pressure. The autoclave is charged to 200 psia with nitrogen. Ethylene oxide is again added to the autoclave incrementally as before while closely monitoring the autoclave pressure, temperature, and ethylene oxide flow rate while maintaining the temperature between 100 and 110° C. and limiting any temperature increases due to reaction exotherm. After the addition of 3887 g of ethylene oxide (88.4 mol, resulting in a total of 20 moles of ethylene oxide per mol of ethoxylatable sites on BHMT), the temperature is increased to 110° C. and the mixture stirred for an additional 2 hours.

The reaction mixture is then collected into a 22 L three neck round bottomed flask purged with nitrogen. The strong alkali catalyst is neutralized by slow addition of 27.2 g methanesulfonic acid (0.28 moles) with heating (100° C.) and mechanical stirring. The reaction mixture is then purged of residual ethylene oxide and deodorized by sparging an inert gas (argon or nitrogen) into the mixture through a gas dispersion frit while agitating and heating the mixture to 120° C. for 1 hour. The final reaction product is cooled slightly, and poured into a glass container purged with nitrogen for storage.

2. Quaternization of bis(hexamethylene)triamine which is ethoxylated to an average of 20 ethoxylations per backbone NH unit: Into a weighed, 500 nm, 3 neck round bottom flask fitted with argon inlet, condenser, addition funnel, thermometer, mechanical stirring and argon outlet (connected to a bubbler) is added BHMT EO20 (150 g, 0.032 mol, 0.096 mol N, 98% active, m.w.-4615) and methylene chloride (300 g) under argon. The mixture is stirred at room temperature until the polymer has dissolved. The mixture is then cooled to 5° C. using an ice bath. Dimethyl sulfate (12.8 g, 0.1 mol, 99%, m.w.-126.13) is slowly added using an addition funnel over a period of 5 minutes. The ice bath is removed and the reaction is allowed to rise to room temperature. After 48 hrs. the reaction is complete.

3. Sulfation of bis(hexamethylene)triamine which is quaternized to about 90% of the backbone nitrogens of the product admixture and which is ethoxylated to an average of 20 ethoxylations per backbone NH unit: Under argon, the reaction mixture from the quaternization step is cooled to 5° C. using an ice bath (BHMT E020, 90+mol % quat, 0.16 mol OH). Chlorosulfonic acid (7.53 g, 0.064 mol, 99%, mw-116.52) is slowly added using an addition funnel. The temperature of the reaction mixture is not allowed to rise above 10° C. The ice bath is removed and the reaction is allowed to rise to room temperature. After 6 hrs. the reaction is complete. The reaction is again cooled to 5° C. and sodium methoxide (28.1 g, 0.13 mol, Aldrich, 25% in methanol, m.w.-54.02) is slowly added to the rapidly stirred mixture. The temperature of the reaction mixture is not allowed to rise above 10° C. The reaction mixture is transferred to a single neck round bottom flask. Purified water (500 ml) is added to the reaction mixture and the methylene chloride, methanol and some water is stripped off on a rotary evaporator at 50° C. The clear, light yellow solution is transferred to a bottle for storage. The final product pH is checked and adjusted to ~9 using 1N NaOH or 1N HCl as needed. Final weight, 530 g.

Example 4

Preparation of Ethoxylated, Quaternized Hexamethylenediamine Quaternized to About 90%, Sulfated to About 45–50% and Ethoxylated to an Average of 24 Ethoxy Units Per NH Unit Step 1: Ethoxylation Hexamethylenediamine (HMDA) (M.W. 116.2, 8.25 grams, 0.071 moles) is placed in a nominally dry flask and dried by stirring for 0.5 hours at 110–120° C. under vacuum (pressure less than 1 mm Hg). The vacuum is released by drawing ethylene oxide (EO) from a pre-purged trap connected to a supply tank. Once the flask is filled with EO, an outlet stopcock is carefully opened to a trap connected to an exhaust bubbler. Mixture is stirred for 3 hours at 115–125° C., $^{1}$H-NMR analysis indicates the degree of ethoxylation is 1 per reactive site. The reaction mixture is then cooled while being swept with argon and 0.30 grams (0.0075 moles) of 60% sodium hydride in mineral oil is added. The stirred reaction mixture is swept with argon until hydrogen evolution ceases. EO is then added to the mixture as a sweep under atmospheric pressure at 117–135° C. with moderately fast stirring. After 20 hours, 288 grams (6.538 moles) of EO have been added to give a calculated total degree of ethoxylation of 24 per reactive site. Finally methanesulfonic acid (M.W. 96.1, 0.72 grams, 0.0075 moles) is added to neutralized base catalyst.

Step 2: Quaternization

To a 1 L, 3-neck, round bottom flask equipped with argon inlet, condenser, addition funnel, thermometer, mechanical stirring and argon outlet (connected to bubbler) is added the ethoxylated HMDA product from Step 1 (M.W. 4340, 130.2 grams, 0.03 moles) and methylene chloride (250 grams) under argon. The mixture is stirred at room temperature until the substrate has dissolved. The mixture is then cooled to 5–10° C. using an ice bath. Dimethyl sulfate (M.W. 126.1, 7.57 grams, 0.06 moles) is dripped in from addition funnel at such a rate the temperature of reaction mixture never exceeds 10° C. After all the dimethyl sulfate is added, the ice bath is removed and the reaction is allowed to rise to room temperature. After mixing overnight (16 hours), the reaction is complete. By $^{1}$H-NMR analysis, 90+% of the amine sites are quaternized.

Step 3: Trans-sulfation

To the apparatus in Step 2 still containing the reaction mixture is added a Dean Stark trap and condenser. Under argon, the reaction mixture from Step 2 is heated to 60° C. for 60 minutes to distill off volatile materials. Sufficient sulfuric acid (conc.) is added to achieve a pH of approximately 2 (pH is measured by taking an aliquot from reaction and dissolving at 10% level in water). Vacuum is applied to reaction (pressure reduced to 19 mm Hg) and is stirred for 60 minutes at 80° C. while collecting any volatile liquids. The mixture is then neutralized to pH 8–9 with 1N NaOH. By $^{1}$H NMR analysis, 90+% of the amine sites remain quated and 45% of the terminal hydroxyl sites of the four ethoxylate chains are sulfated.

Example 5

Preparation of Ethoxylated Polyethylene Imine Having an Average Backbone Molecular Weight of 189 Da and an Average Degree of Ethoxylation of 20

Tetraethylenepentamine (TEPA) (M.W. 189, 61.44 g., 0.325 moles) is placed in a nominally dry flask and dried by stirring for 0.5 hours at 110–120° C. under a vacuum (pressure less than 1 mm.) The vacuum is released by drawing ethylene oxide (EO) from a prepurged trap connected to a supply tank. Once the flask is filled with EO, an outlet stopcock is carefully opened to a trap connected to an exhaust bubbler. After 3 hours stirring at 107–115° C., 99.56 g of EO is added to give a calculated degree of ethoxylation of 0.995. The reaction mixture is cooled while being swept with argon and 2.289 g. (0.057 moles) of 60% sodium hydride in mineral oil is then added. The stirred reaction mixture is swept with argon until hydrogen evolution ceased. EO is then added to the reaction mixture under atmospheric pressure at 109–118° C. with moderately fast stirring. After 23 hours, a total of 1503 g. (34.17 moles) of EO had been added to give a calculated total degree of ethoxylation of 15.0. The ethoxylated TEPA obtained is a tan waxy solid.

Example 7

Solid/Granular Cleaning Compositions

| Ingredients | 6 | 7 | 8 | 9 | 10 | 11 |
|---|---|---|---|---|---|---|
| Sodium $C_{11}$–$C_{13}$ alkylbenzene-sulfonate | 3.15 | 3.15 | 18.0 | 18.0 | 18.0 | 8.8 |
| Sodium $C_{14}$–$C_{15}$ alcohol sulfate | 4.11 | 4.11 | — | — | — | 0.43 |
| Sodium $C_{14}$–$C_{15}$ alcohol ethoxylate (0.5) sulfate | — | — | 0.8 | 0.8 | — | — |
| $C_{16}$ Branched Alkyl Sulfate[1] | 9.6 | 9.6 | — | — | — | 1.0 |
| $C_{14}$–$C_{15}$ alcohol ethoxylate (6.5) | — | — | 0.5 | 0.5 | 1.4 | 3.52 |
| Quaternary Amine Surfactant[2] | — | — | 0.6 | 0.6 | — | — |
| Bleach activator[3] | 5.28 | 5.28 | — | — | 0.75 | — |
| Sodium tripolyphosphate | — | — | 20.0 | 20.0 | 32.0 | — |
| Zeolite A, hydrate (0.1–10 micron size) | 24.6 | 24.6 | — | — | — | 18.38 |
| Sodium carbonate | 21.78 | 21.78 | 15.26 | 15.26 | 9.4 | 15.38 |
| Poly(ethyleneglycol), MW ~4000 (50%) | 0.41 | 0.41 | — | — | — | — |
| CMC (Carboxymethylcellulose) | — | — | 0.2 | 0.2 | — | 0.2 |
| Sodium Polyacrylate (45%) | 1.18 | 1.18 | 0.5 | 0.5 | 0.6 | 1.1 |
| Soil release agent[4] | — | — | — | — | — | 0.10 |
| Polymer a[5] | 0.5 | — | — | 0.5 | 0.6 | 1.0 |
| Polymer b | — | — | 0.5 | — | — | — |
| Polymer c | — | 0.5 | — | — | — | — |

-continued

| Ingredients | 6 | 7 | 8 | 9 | 10 | 11 |
|---|---|---|---|---|---|---|
| Polymer d | 0.5 | — | 0.5 | — | — | — |
| Polymer e | — | 0.5 | — | — | 0.5 | — |
| Polymer f | — | — | — | 0.5 | — | 0.5 |
| Sodium silicate (1:6 ratio $NaO/SiO_2$)(46%) | — | — | 5.79 | 5.79 | 6.9 | 0.13 |
| Sodium Sulfate | — | — | — | — | 10.0 | 25.0 |
| Sodium Perborate | 1.0 | 1.0 | — | — | 3.63 | — |
| DTPA[6] | — | — | 0.3 | 0.3 | 0.3 | — |
| Citric acid | — | — | — | — | — | — |
| Water, additives and other minors[7] | balance | balance | balance | balance | balance | balance |

[1]According to U.S. Pat. No. 6,060,443 Cripe et al.
[2]Quaternary Amine Surfactant $R_2N(CH_3)(C_2H_4OH)_2X$ with $R_2 = C_{12}$–$C_{14}$, X = $Cl^-$.
[3]Nonyl ester of sodium p-hydroxybenzene-sulfonate.
[4]Soil release agent according to U.S. Pat. No. 5,415,807 Gosselink et al., issued May 16, 1995.
[5]Hydrophobically modified polyamine according to Example 1.
[6]DTPA = diethylenetriaminepentaacetic acid
[7]Balance to 100% can, for example, include minors like optical brightener, perfume, soil dispersant, chelating agents, dye transfer inhibiting agents, additional water, and fillers, including $CaCO_3$, talc, silicates, aesthetics, etc. Other additives can include various enzymes, bleach catalysts, perfume encapsulates and others.
Polymer a Polymer according to Example 4
Polymer b Polymer according to Example 3
Polymer c Polymer according to Example 2
Polymer d Acusol ® 480 N
Polymer e Alcosperse ® 725
Polymer f Copolymer comprised of polyethylene glycol (PEG) grafted with acrylic acid & maleic acid (described in U.S. Pat. No. 5,952,432).

Example 8

Fluid/Liquid Cleaning Compositions

| Ingredients | A | B | C | D | E | F | G | H | I | J | K | L |
|---|---|---|---|---|---|---|---|---|---|---|---|---|
| $C_{12}$ linear alkyl benzene sulfonate | 5.4 | 5.4 | 5.4 | 2.9 | 4.4 | 21.8 | 6.2 | — | 12.2 | 12.2 | — | 15.0 |
| $C_{12-15}$ alcohol ethoxy$_{(1.1-2.5)}$ sulfate | 12.3 | 12.3 | 12.3 | 9.6 | 14.4 | — | 9.0 | 4.5 | — | — | 20.2 | — |
| $C_{12-15}$ alcohol ethoxylate$_{(7-9)}$ | 2.2 | 2.2 | 2.2 | 1.5 | 1.6 | 18.5 | 7.7 | 26.6 | 8.8 | 16.4 | 2.4 | 8.4 |
| cocodimethyl amine oxide | 0.7 | 0.7 | 0.7 | — | 1.6 | 1.7 | — | — | 1.5 | 1.5 | 1.2 | 1.4 |
| fattyacid | 2.0 | 2.0 | 2.0 | 0.5 | 11.5 | 16.4 | 1.0 | 17.3 | 8.3 | 10.0 | 6.9 | 10.0 |
| citric acid | 4.0 | 4.0 | 4.0 | 1.6 | 2.5 | 1.5 | 2.5 | 1.4 | 3.4 | 3.4 | 2.1 | 1.0 |
| DTPA | 0.2 | 0.2 | 0.2 | — | 0.5 | — | — | — | — | — | — | — |
| DTPMP | — | — | — | — | — | 0.9 | — | — | 0.3 | 0.3 | — | 0.3 |
| HEDP | — | — | — | — | — | — | — | 0.4 | — | — | — | — |
| polymer a | — | 0.3 | — | 0.1 | 0.6 | — | 1.0 | 0.5 | 0.5 | 1.0 | — | 0.5 |
| polymer b | — | 0.6 | — | 0.2 | — | — | — | — | 0.5 | — | — | 0.5 |
| polymer c | — | — | — | — | — | 1.6 | — | — | — | — | — | — |
| polymer d | 0.9 | — | 0.9 | — | — | — | — | — | — | — | 1.6 | — |
| polymer e | 0.9 | — | — | — | — | — | 1.0 | — | 1.0 | — | — | — |
| polymer f | — | — | — | 0.3 | — | — | — | — | — | 1.0 | — | — |
| polymer g | — | — | — | — | 0.6 | — | — | — | — | — | — | — |
| polymer h | — | — | 0.9 | — | — | — | — | — | — | — | — | 1.0 |
| polymer i | — | 0.9 | — | — | — | — | — | — | — | — | 0.4 | |
| polymer j | — | — | — | — | — | — | | 0.5 | — | — | — | — |
| protease | 0.9 | 0.9 | 0.9 | 0.3 | 1.0 | 1.0 | 0.5 | 0.7 | 0.7 | 0.7 | 0.6 | — |
| amylase | 0.1 | 0.1 | 0.1 | 0.1 | 0.2 | 0.3 | — | 0.1 | 0.1 | 0.1 | 0.2 | — |
| Lipolase ® | — | — | — | — | — | — | 0.1 | — | — | — | — | — |
| borax | 1.5 | 1.5 | 1.5 | — | 1.0 | — | 2.6 | 1.4 | 2.4 | 2.4 | 1.7 | — |
| calcium formate | 0.1 | 0.1 | 0.1 | 0.1 | 0.1 | 0.1 | — | — | 0.1 | 0.1 | 0.1 | — |
| sodium hydroxide | 3.6 | 3.6 | 3.6 | 1.8 | 3.0 | — | 2.3 | 3.3 | 4.9 | 4.9 | — | 0.2 |
| monoethanolamine | 1.5 | 1.5 | 1.5 | 1.2 | 0.5 | 11.5 | — | — | 0.8 | 0.8 | 7.6 | 7.2 |
| 1,2-propanediol | 3.9 | 3.9 | 3.9 | 2.5 | 4.0 | 15.6 | 4.9 | 0.9 | 4.9 | 4.9 | 8.0 | 8.5 |
| glycerol | 3.2 | 3.2 | 3.2 | 0.4 | — | — | — | — | — | — | — | — |
| ethanol | 2.5 | 2.5 | 2.5 | 1.3 | 0.5 | — | 1.7 | 1.5 | 1.4 | 1.4 | 2.4 | 1.0 |
| sodium cumene sulfonate | — | — | — | — | — | — | — | — | 2.0 | 2.0 | — | 2.0 |
| brightener | 0.10 | 0.10 | 0.10 | 0.05 | 0.10 | 0.3 | 0.10 | 0.05 | 0.1 | 0.1 | — | 0.1 |
| hydroxylated castor oil (structurant) | — | — | — | — | — | — | — | — | 0.2 | 0.2 | — | — |

-continued

| Ingredients | A | B | C | D | E | F | G | H | I | J | K | L |
|---|---|---|---|---|---|---|---|---|---|---|---|---|
| sodium sulfate | — | — | — | — | 3.0 | — | — | — | — | — | — | — |
| water, dye, and perfume | balance | balance | balance | balance | balance | balance | balance | balance | balance | balance | balance | balance |

DTPA diethylenetriaminepentaacetic acid, sodium salt
DTPMP diethylenetriaminepentamethylenephosphonic acid, sodium salt
HEDP hydroxyethyl-1,1-diphosphonic acid, sodium salt
a Polymer according to Example 5
b Polymer according to Example 1
c N,N-dimethylhexamethylenediamine with an average degree of ethoxylation = 24
d Polymer according to Example 4
e Alcosperse ® 725
f Acusol ® 480 N
g 5 k MW terpolymer of acrylic acid, maleic acid, ethyl acrylate (70/10/20 w/w)
h BASF Sokalan ® ES 8305
i 8.9 k MW terpolymer of acrylic acid, maleic acid, ethoxyglycidyl acrylate
j Copolymer comprised of PEG grafted with acrylic acid & maleic acid (described in U.S. Pat. No. 5,952,432)
Lipolase ® supplied by Novozymes of Denmark.
Examples E & H are gel products with internal structuring provided by lamellar phase.
Example F is a compact low moisture detergent suitable for delivery in a polyvinyl alcohol unit dose pouch.
Examples I & J are structured with hydroxylated castor oil.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A polymer system comprising:

A.) an anionic polymer selected from the group consisting of (i) anionic polymers comprising;

a.) a first moiety derived from monoethylenically unsaturated $C_3$–$C_8$ monomers comprising at least one carboxylic acid group, salts of such monomers, and mixtures thereof; and b.) a second moiety selected from the group consisting of:

(1) moieties derived from modified unsaturated monomers having the formulae R—Y-L and R-Z wherein:

i.) R is selected from the group consisting of $C(X)H{=}C(R^1)$— wherein $R^1$ is H, or $C_1$–$C_4$ alkyl; and X is H, $CO_2H$, or $CO_2R_2$ wherein $R_2$ is alkali metals, alkaline earth metals, ammonium and amine bases, saturated $C_1$–$C_{20}$ alkyl, $C_6$–$C_{12}$ aryl, and $C_7$–$C_{20}$ alkylaryl;

ii.) Y is selected from the group consisting of —$CH_2$—, —$CO_2$—, —OCO—, —CON($R^a$)—, and —$CH_2OCO$—; wherein $R^a$ is H or $C_1$–$C_4$ alkyl;

iii.) L is selected from the group consisting of hydrogen, alkali metals, alkaline earth metals, ammonium and amine bases, saturated $C_1$–$C_{20}$ alkyl, $C_6$–$C_{12}$ aryl, and $C_7$–$C_{20}$ alkylaryl; and iv.) Z is selected from the group consisting of $C_6$–$C_{12}$ aryl and $C_7$–$C_{12}$ arylalkyl; and (2) moieties having the formula J-G-D wherein:

i.) J is selected from the group consisting of $C(X)H{=}C(R_1)$— wherein $R_1$ is H, or $C_1$–$C_4$ alkyl; X is H, $CO_2H$, or $CO_2R_2$ wherein $R_2$ is alkali metals, alkaline earth metals, ammonium and amine bases, saturated $C_2$–$C_{20}$ alkyl, $C_6$–$C_{12}$ aryl, $C_7$–$C_{20}$ alkylaryl;

ii.) G is selected from the group consisting of $C_1$–$C_4$ alkyl, —O—, —$CH_2O$—, —$CO_2$—;

iii.) D is selected from the group consisting of

—$CH_2CH(OH)CH_2O(R^3O)_dR_4$;

—$CH_2CH[O(R^3O)_dR^4]CH_2OH$;

—$CH_2CH(OH)CH_2NR^5(R^3O)_dR^4$;

—$CH_2CH[NR^5(R^3O)_dR^4]CH_2OH$, and mixtures thereof; wherein $R^3$ is selected from the group consisting of ethylene, 1,2-propylene, 1,3-propylene, 1,2-butylene, 1,4-butylene, and mixtures thereof; $R^4$ is a capping unit selected from the group consisting of H, $C_1$–$C_4$ alkyl, $C_6$–$C_{12}$ aryl and $C_7$–$C_{20}$ alkylaryl; $R^5$ is selected from the group consisting of H, $C_1$–$C_4$ alkyl $C_6$–$C_{12}$ aryl and $C_7$–$C_{20}$ alkylaryl; and subscript index d is an integer from 1 to 100;

(ii) graft co-polymers comprising a first moiety derived from monoethylenically unsaturated $C_3$–$C_8$ monomers comprising at least one carboxylic acid group, salts of such monomers, and mixtures thereof, said first moieties being grafted onto a $C_1$–$C_4$ carbon polyalkylene oxide, and mixtures thereof; and B.) a modified polyamine polymer selected from the group consisting of (i) modified polyamines having the formulae $$V_{(n+1)}W_mY_nZ \text{ or } V_{(n-k+1)}W_mY_nY'_kZ$$

wherein m is an integer from 0 to about 400; n is an integer from 0 to about 400; k is less than or equal to n wherein a.) V units are terminal units having the formula:

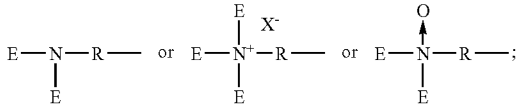

b.) W units are backbone units having the formula:

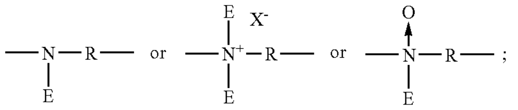

c.) Y and Y' units are branching units having the formula:

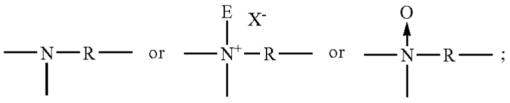 and d.) Z units are terminal units having the formula:

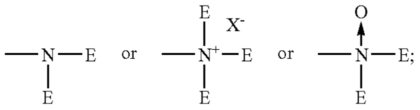

wherein:

R units are selected from the group consisting of $C_2$–$C_{12}$ alkylene, $C_4$–$C_{12}$ alkenylene, $C_3$–$C_{12}$ hydroxyalkylene, $C_4$–$C_{12}$ dihydroxy-alkylene, $C_8$–$C_{12}$ dialkylarylene, $—(R^1O)_xR^1—$, $—(R^1O)_xR^5(OR^1)_x—$, $—(CH_2CH(OR^2)CH_2O)_z—(R^1O)_yR^1(OCH_2CH(OR^2)CH_2)_w—$, $—C(O)(R^4)_rC(O)—$, $—CH_2CH(OR^2)CH_2—$, and mixtures thereof; wherein $R^1$ is $C_2$–$C_3$ alkylene and mixtures thereof;

$R^2$ is hydrogen, $—(R^1O)_xB$, and mixtures thereof;

wherein at least one B is selected from the group consisting of $—(CH_2)_q—SO_3M$, $—(CH_2)_pCO_2M$, $—(CH_2)_q(CHSO_3M)CH_2SO_3M$, $—(CH_2)_q—(CHSO_2M)CH_2SO_3M$, $—(CH_2)_pPO_3M$, $—PO_3M$, and mixtures thereof, and any remaining B moieties are selected from the group consisting of hydrogen, $C_1$–$C_6$ alkyl, $—(CH_2)_q—SO_3M$, $—(CH_2)_pCO_2M$, $—(CH_2)_q(CHSO_3M)CH_2SO_3M$, $—(CH_2)_q—(CHSO_2M)CH_2SO_3M$, $—(CH_2)_pPO_3M$, $—PO_3M$, and mixtures thereof;

$R^4$ is $C_1$–$C_{12}$ alkylene, $C_4$–$C_{12}$ alkenylene, $C_8$–$C_{12}$ arylalkylene, $C_6$–$C_{10}$ arylene, and mixtures thereof;

$R^5$ is $C_1$–$C_{12}$ alkylene, $C_3$–$C_{12}$ hydroxy-alkylene, $C_4$–$C_{12}$ dihydroxyalkylene, $C_8$–$C_{12}$ dialkylarylene, $—C(O)—$, $—C(O)NHR^6NHC(O)—$, $—R^1(OR^1)—$, $—C(O)(R^4)_rC(O)—$, $—CH_2CH(OH)CH_2—$, $—CH_2CH(OH)CH_2O(R^1O)_yR^1—OCH_2CH(OH)CH_2—$, and mixtures thereof;

$R^6$ is $C_2$–$C_{12}$ alkylene or $C_6$–$C_{12}$ arylene;

X is a water soluble anion; provided at least one backbone nitrogen is quaternized or oxidized E units are selected from the group consisting of hydrogen, $C_1$–$C_{22}$ alkyl, $C_3$–$C_{22}$ alkenyl, $C_7$–$C_{22}$ arylalkyl, $C_2$–$C_{22}$ hydroxyalkyl, $—(CH_2)_pCO_2M$, $—(CH_2)_qSO_3M$, $—CH(CH_2CO_2M)—CO_2M$, $—(CH_2)_pPO_3M$, $—(R^1O)_xB$, $—C(O)R^3$, and mixtures thereof; provided that when any E unit of a nitrogen is a hydrogen, said nitrogen is not also an N-oxide;

$R^1$ is $C_2$–$C_3$ alkylene and mixtures thereof;

$R^3$ is $C_1$–$C_{18}$ alkyl, $C_7$–$C_{12}$ arylalkyl, $C_7$–$C_{12}$ alkyl substituted aryl, $C_6$–$C_{12}$ aryl, and mixtures thereof;

at least one B is selected from the group consisting of $—(CH_2)_q—SO_3M$, $—(CH_2)_pCO_2M$, $—(CH_2)_q(CHSO_3M)CH_2SO_3M$, $—(CH_2)_q—(CHSO_2M)CH_2SO_3M$, $—(CH_2)_pPO_3M$, $—PO_3M$, and mixtures thereof, and any remaining B moieties are selected from the group consisting of hydrogen, $C_1$–$C_6$ alkyl, $—(CH_2)_q—SO_3M$, $—(CH_2)_pCO_2M$, $—(CH_2)_q(CHSO_3M)CH_2SO_3M$, $—(CH_2)_q—(CHSO_2M)CH_2SO_3M$, $—(CH_2)_pPO_3M$, $—PO_3M$, and mixtures thereof;

M is hydrogen or a water soluble cation in sufficient amount to satisfy charge balance; and wherein the values for the following indices are as follows: subscript index p is an integer from 1 to 6; subscript index q is an integer from 0 to 6; subscript index r has the value of 0 or 1; subscript index w has the value 0 or 1; subscript index x is an integer from 1 to 100; subscript index y is an integer from 0 to 100; and subscript index z has the value 0 or 1;

(ii) modified polyamines having formula (I):

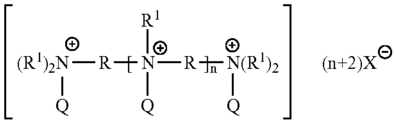 wherein;

a.) R is $C_6$–$C_{20}$ linear or branched alkylene, and mixtures thereof;

b.) $X^{\ominus}$ is an anion present in sufficient amount to provide electronic neutrality;

c.) n and subscript index n have equal values and are integers from 0 to 4;

d.) $R^1$ is a capped polyalkyleneoxy unit having formula:

$$—(R^2O)_x—R^3$$

wherein $R^2$ is $C_2$–$C_4$ linear or branched alkylene, and mixtures thereof; subscript index x has a value from about 1 to about 50; at least one $R^3$ moiety is an anionic capping unit, with the remaining $R^3$ moieties being selected from the group comprising hydrogen, $C_1$–$C_{22}$ alkylenearyl, an anionic capping unit, a neutral capping unit, and mixtures thereof;

e.) at least one Q moiety, is a hydrophobic quaternizing unit selected from the group comprising $C_7$–$C_{30}$ substituted or unsubstituted alkylenearyl, and mixtures thereof, any remaining Q moieties are selected from the group comprising lone pairs of electrons on the unreacted nitrogens, hydrogen, $C_1$–$C_{30}$ substituted or unsubstituted linear or branched alkyl, or $C_3$–$C_{30}$ substituted or unsubstituted cycloalkyl, and mixtures thereof;

and mixtures thereof.

2. The polymer system of claim 1 wherein said modified polyamine polymer is selected from the group consisting of polymers having the following formulae:

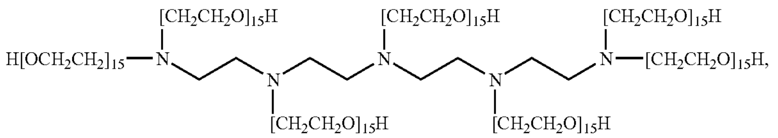
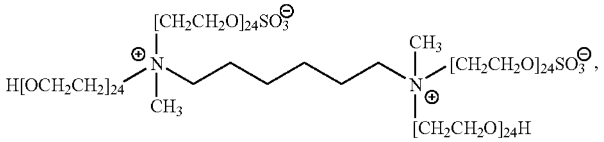
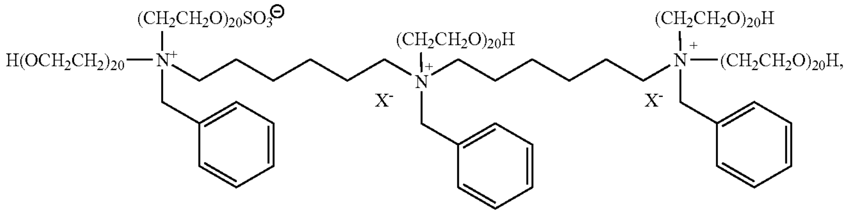
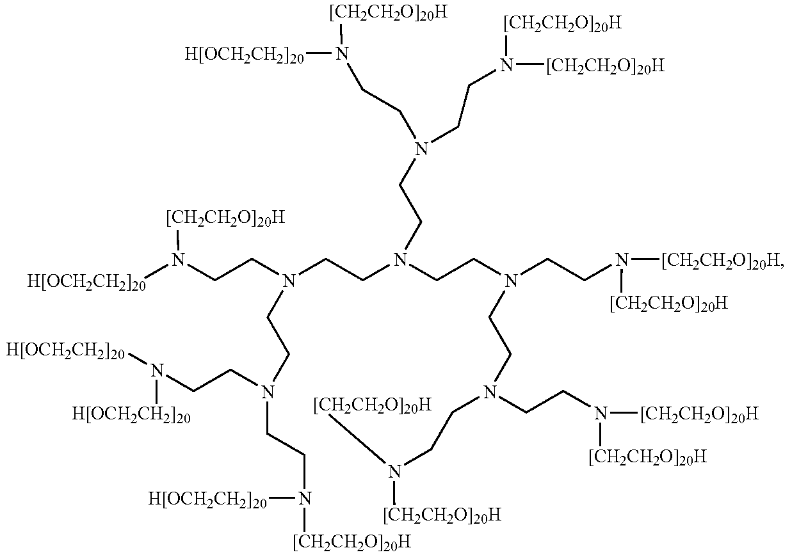
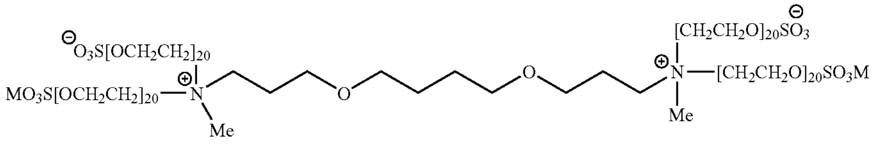
and mixtures thereof.
3. A cleaning composition comprising the polymer system of claim 1.
* * * * *

UNITED STATES PATENT AND TRADEMARK OFFICE

CERTIFICATE OF CORRECTION

PATENT NO. : 7,163,985 B2 
APPLICATION NO. : 10/661317
DATED : January 16, 2007
INVENTOR(S) : Rafael Ortiz et al.

It is certified that error appears in the above-identified patent and that said Letters Patent is hereby corrected as shown below:

<u>Column 18</u>
Line 32, delete "nm" and insert -- ml --.
<u>Claim 1, Column 25</u>
Line 61, delete "X" and insert -- $X^-$ --.

Signed and Sealed this

Second Day of June, 2009

JOHN DOLL
*Acting Director of the United States Patent and Trademark Office*